United States Patent Office 2,917,416
Patented Dec. 15, 1959

2,917,416

POLYVINYL ACETAL-PHENOL ALDEHYDE RESIN WIRE ENAMEL AND METHOD OF USING SAME

Edward Lavin and James A. Cote, Springfield, Mass., assignors to Shawinigan Resins Corporation, Springfield, Mass., a corporation of Massachusetts No Drawing. Application October 25, 1955
Serial No. 542,791

5 Claims. (Cl. 117—232)

This invention relates to wire enamels; more particularly, this invention relates to highly solvent resistant wire enamels comprising polyvinyl acetals and phenol-aldehyde resins.

Wire enamels comprising a polyvinyl formal and a soluble heat-hardenable phenolic resin have been used in industry since they were first disclosed in U.S. Patent 2,307,588 to Jackson and Hall. These enamels are applied to wire and then heat cured to coatings possessing high dielectric strength, good adhesion to metal, flexibility, and resistance to abrasion, stress, heat, chemicals and solvents. However, the cure must be carefully controlled since the properties are in a delicate balance to each other. For example, an excessive cure will produce enamelled wire having coatings lacking flexibility and adhesion, while hardness and resistance to abrasion and solvents are improved.

The need for a proper degree of cure in these wire enamels has increased with the use of new lubricants and refrigerants that may come in contact with enamelled wires in various applications and with the use of these wires in higher temperature operations.

An object of this invention is to provide a wire enamel with a wider curing range. Another object is to provide wire enamels which, when applied to electrical conductors, are highly resistant to solvents.

A further object is to provide wires coated with improved wire enamels comprising a polyvinyl acetal and a heat-hardenable phenol-aldehyde resin.

These and other objects are attained by modifying enamels comprising polyvinyl acetals of the group consisting of the acetals of formaldehyde, acetaldehyde, propionaldehyde, and butyraldehyde and soluble, heat-hardenable, phenol aldehyde resins with from 0.05–3% of hexamethylenetetramine, based on the weight of the polyvinyl acetal.

This invention is illustrated but not limited by the following examples in which the parts are by weight.

Example I

One hundred parts of a polyvinyl formal were dissolved in a solution of 50 parts of a heat-hardenable cresol-formaldehyde resin in 300 parts of cresol and 450 parts high-solvency coal tar hydrocarbon (B.P. 150–184° C.). Six successive coats of this solution were applied to 0.05 inch diameter copper wire by conventional wire coating means, each coating being cured by passing through a vertical oven 12 feet high at a rate of 9 ft./min. The hottest portion of the oven was approximately 4 feet long and had a temperature of about 335° C.

Example II

The wire enamel of Example I was modified by dissolving 0.3 part hexamethylene tetramine per 100 parts polyvinyl formal in the solution. This was applied to copper wire in a manner identical to Example I.

The wire coatings of both examples possessed good electrical properties, adhesion to the wire, flexibility, resistance to abrasion and resistance to stress.

The solvent resistance of these coatings was tested by placing 4 strands, approximately 30 inches long, of each of the wires in a refluxing mixture of equal volumes of ethyl alcohol and toluene. After 10 minutes the wires were removed and immediately touched against each other to detect any tackiness. The wires were then examined for any softening, swelling, tubing, curling, loosening, blisters, etc. The coating of Example I was tacky, spotted with blisters and swollen, while the Example II coating remained intact.

These wires were tested within 20 hours after preparation. This increases the detection of any lack of solvent resistance, for the solvent resistance of wire enamels usually increases on aging. To pass this test there must be no visible attack of the coatings by the solvents except for a slight swelling at the tip and some loosening or curling at the tip.

The effect of the extent of cure is illustrated in Examples III to VII. Twelve coats of enamel were applied in these examples and the curing time was changed by varying the speed with which the wire was passed through the oven. Enamel compositions similar to those of Example I were coated on wire and cured as in Example I.

| Example | Hexamethylenetetramine (Parts per 100 Parts Polyvinyl Formal) | Alcohol/Toluene Resistance | | |
|---|---|---|---|---|
| | | 11 | 9.5 | 8.5 |
| | | (ft./min. passing through oven) | | |
| III (a) | | F | F | P |
| III (b) | 0.1 | P | P | P |
| III (c) | 0.06 | P | P | P |
| IV (a) | | F | F | F |
| IV (b) | 0.1 | S | P | P |
| V (a) | | F | F | S |
| V (b) | 0.3 | P | P | P |
| VI (a) | | F | P | P |
| VI (b) | 1.0 | P | P | P |
| VII (a) | | F | F | F |
| VII (b) | 3.0 | P | P | P |

P = perfect solvent resistance; F = complete failure; S = some failure on no more than 2 strands.

The wire enamels containing hexamethylenetetramine all produced highly satisfactory insulative coatings, being solvent resistant, flexible, adherent, abrasion resistant, and having excellent electrical properties. Some of the unmodified enamel coatings were deficient in other characteristics besides solvent resistance. These are listed below.

| Example | Wire Curing Speed | Failure |
|---|---|---|
| III(a) | 8.5 | Brittle. |
| VI(a) | 8.5 | Brittle and lacking adhesion. |
| VI(a) | 9.5 | Brittle. |
| IV(a) | 9.5 | Poor abrasion resistance. |
| IV(a) | 11 | Do. |
| VII(a) | 11 | Do. |

The addition of hexamethylenetetramine to these enamels not only overcomes the overcuring of the first three of these deficient wires but also overcomes the undercure of the latter three.

The phenol-aldehyde resins used in the above examples were prepared from formaldehyde and a commercial cresylic acid. This cresylic acid contains meta and para cresols and some xylenols. The resins were produced by refluxing a mixture of 100 parts of the cresylic acid, 60 parts of formalin (37% formaldehyde) and 3.2 parts triethanolamine in a kettle at about 80° C. for about 2.5 hours. The reaction product was thereupon dehydrated under vacuum and the resin obtained in the form of a viscous liquid.

The phenolic resins used in these wire enamels are prepared by reacting 1 mol of a phenol with from .75 to 2 mols of a lower aldehyde under alkaline conditions. Acetaldehyde, propionaldehyde and butyraldehyde may be used, but formaldehyde is usually preferred because of its greater reactivity. Phenolformaldehyde resins are available on the open market and are commonly used in coating compositions. Superior wire enamels are obtained and the effect of hexamethylenetetramine is increased if triethanolamine is the catalyst used to prepare these resins. The phenols should be monohydric phenols such as phenol, cresols, xylenols, ethyl phenol, p-t-butyl phenol, etc. Mixtures are preferred consisting substantially of meta and para cresols.

The polyvinyl formal resins used in the examples were prepared by adding 83 parts of formalin (37% formaldehyde) and 6.8 parts of concentrated sulfuric acid to a solution of 100 parts of polyvinyl acetate dissolved in 185 parts of glacial acetic acid in a suitable vessel. Hydrolysis and formalization were carried out simultaneously at a temperature of about 70° C. Thirteen parts of concentrated ammonium hydroxide were used as a neutralizing agent, and the mass was then precipitated in water to form fine particles, washed and dried. The neutralization was effected at a point of conversion yielding a resin containing 5–6% alcohol groups and 9.5–13% acetate groups, calculated respectively by weight as polyvinyl alcohol and polyvinyl acetate, the remainder being the formal.

Polyvinyl acetals acetalized with a member of the group consisting of formaldehyde, acetaldehyde, propionaldehyde, butyraldehyde and mixtures thereof have been used in the wire enamels of this invention. These enamel compositions all exhibited the increased solvent resistance and extended curing range due to the hexamethylenetetramine. Acetalization with a mixture of aldehydes produces co-acetals which may be desired in various wire enamels requiring special resin properties. Polyvinyl acetals of other saturated aliphatic aldehydes may also be used as well as mixtures of any of the aforementioned polyvinyl acetals. The hardness of the cured wire enamels decreases with an increased number of carbons in the acetal groups of the polyvinyl acetal resins used, polyvinyl butyral yielding the softest coating. Wire enamels containing polyvinyl formals are preferred when high abrasion resistance is required. The polyvinyl acetals used in this invention may be prepared by various known methods from vinyl ester polymers by acetalization during or subsequent to the hydrolysis of the polymers. These polyvinyl acetals may contain from about 3–9% alcohol groups and from about 5–15% ester groups, calculated respectively by weight as polyvinyl alcohol and polyvinyl ester.

The neutralizing agent used in the preparation of the polyvinyl acetals should be ammonium hydroxide or an amine base such as ethanolamine, triethanolamine, morpholine, benzylamine, dimethylamine, ortho-tolylbiguanide, etc. Polyvinyl formals and butyrals neutralized with ammonia or amine type bases are readily available commercially. Wire enamels containing polyvinyl acetals neutralized with alkali metal hydroxides or their basic salts do not exhibit the beneficial effects of the hexamethylene-tetramine.

Improved solvent resistance and an extended curing range are obtained in wire enamels comprising, in parts by weight, 5–100 parts of a soluble, fusible, heat-hardenable phenolaldehyde resin and 100 parts polyvinyl acetal including from 0.05–3 parts of hexamethylenetetramine. The preferred amounts of hexamethylenetetramine are from 0.1–1.5 parts. The use of more than 5 parts causes a decrease in the dielectric strength of the coatings, tends to decrease the smoothness of the coatings and may actually increase the amount of material extractible with methanol. These modified wire enamels may be cured at a faster rate or lower temperature to obtain an insulative coating comparable or superior to the unmodified enamel, and the detrimental effects of excessively long or high temperature cures are decreased.

The hexamethylenetetramine should be mixed with the polyvinyl acetal or added to the wire enamel as in the examples. The wire enamel containing hexamethylenetetramine should not be allowed to stand any length of time before using, since premature crosslinking between the resins may occur.

A variety of other organic amines have been tested in place of the hexamethylenetetramine. Those giving no improvement include ethyl amine, dimethyl amine, diamyl amine, triethylenetetramine, triethanolamine, polymeric amides (nylons), amine derivatives of long chain fatty acids, acetamide, choline, ethanolamine, diethanolamine, pyridine, etc. In some instances, hexamethylenediamine exhibited some improvement on the curing range.

Formaldehyde and paraformaldehyde were also tested as additives for phenolic resin containing polyvinyl acetal wire enamels. The former showed no improvement in curing range or solvent resistance, while the use of the latter resulted in coatings inferior in many respects, including a decreased solvent resistance. The addition of NH₄OH to the wire enamels was without improvement. Negative results were also obtained with KOH and with a combination of KOH and NH₄OH. In fact, the presence of any strongly alkaline materials worked as a cure retarder. The addition of NH₄OH with formaldehyde gave another negative result.

A study of the alcohol-toluene extractibles of the coatings gave no indication of the mechanisms involved in the improved solvent resistance of the enamel coatings of this invention. In some instances the modified coating showed a greater decrease in the amount of phenolic resin extracted, and at other times the addition of hexamethylenetetramine caused a greater decrease in the amount of polyvinyl formal extracted as compared to unmodified coatings. The poor solvent resistance to the alcohol-toluene mixture is usually an indication of an undercured coating; however, many overcured coatings also exhibit this defect. This solvent resistance test may therefore also be used as a quick test for the optimum cure of the coating.

The examples shown illustrate the wider curing range of the wire enamels of this invention. Heretofore, it has been necessary to check each lot of wire enamel to determine whether the oven temperature or curing time used will furnish the desired cure. Such close control is no longer necessary with these new coating compositions. In addition, it has been found that certain batches of phenolic resin (usually ones that have been stored too long) unusable in conventional wire enamels can be used in these compositions.

It has been observed that the difficulty of obtaining good solvent resistance increases with the coating thickness. The beneficial effects of the hexamethylenetetramine are most evident in the thickest coatings, viz. 0.002" to 0.004". This is equivalent to the build of 4 to 8 mils usually obtained from 12 coats of enamel, wires so coated being referred to in the trade as QF enamelled wire.

The use of wire enamels comprising a polyvinyl formal and a heat-hardenable phenolic is well known. The modified enamels of this invention may be handled in an identical manner. They may be cured at temperatures from 250–450° C. Suitable solvents used in these enamels may be cresols, furfural, coal tar naphthas, high-boiling or high-solvency hydrocarbons, other aromatic solvents such as toluol, xylol, etc. However, almost any volatile, non-reactive, organic solvents for the enamel components with a satisfactory rate of evaporation during the cure may be used. It is preferred to use as part of the solvent the phenol used in the preparation of the phenol-aldehyde resin. This solvent is usually premixed with the phenolic resin to facilitate the handling of the viscous resin. The enamels are used effectively on nickel, aluminum, cobalt, tin, etc., as well as on copper. They may be used in other coating applications requiring efficient insulative materials, as well as on wires. Various other materials such as fillers, plasticizers, coloring agents, etc. may be incorporated in the compositions described above, as is conventional in the art.

These modified enamels have a wider curing range and the cured coatings exhibit improved flexibility and adhesion, as well as superior solvent resistance, while retaining the excellent electrical properties. The wide curing range is a highly desirable quality commercially. It not only decreases the need for a careful control of the curing but also allows the coating to be economically applied at higher speeds or lower temperatures.

The foregoing, and especially the examples, are merely illustrative of the invention and it is obvious that many variations may be made within the scope of the invention.

What is claimed is:

1. An electrical insulating liquid wire enamel coating composition comprising an organic solvent solution containing as essential ingredients, in parts by weight, (a) 100 parts of a polyvinyl acetal of a saturated aliphatic aldehyde (b) 5-100 parts of a soluble, heat hardenable, phenol aldehyde resin obtained by condensing 1 mol of a phenol selected from the group consisting of phenol, cresol, xylenol and mixtures thereof, with from 0.75 to 2 mols of formaldehyde under alkaline conditions (c) 0.05-3 parts hexamethylenetetramine, said polyvinyl acetal having been neutralized after acetalization with a material taken from the group consisting of ammonium hydroxide and organic amines.

2. A composition as in claim 1 wherein the polyvinyl acetal is prepared by acetalizing with a member of the group consisting of formaldehyde, acetaldehyde, propionaldehyde, butyraldehyde and mixtures thereof.

3. A composition as in claim 1 wherein the polyvinyl acetal is polyvinyl formal, said polyvinyl formal having been neutralized with ammonium hydroxide.

4. A wire coated with the composition of claim 1 on its surface said coating having been dried and heat cured at temperatures from 250–450° C. to an infusible state on the wire.

5. In a process for producing a wire coated with an insoluble, insulative coating, the step comprising adding 0.05–3 parts by weight of hexamethylenetetramine to a liquid coating composition comprising, in parts by weight, an organic solvent solution of 100 parts of a polyvinyl acetal of a saturated aliphatic aldehyde and 5–100 parts of a soluble, heat-hardenable, phenol-aldehyde resin, thereupon coating the composition on a wire, drying and heat curing at temperatures from 250–450° C., said polyvinyl acetal having been acetalized with a member of the group consisting of formaldehyde, acetaldehyde, propionaldehyde, butyraldehyde and mixtures thereof and thereafter having been neutralized with a material taken from the group consisting of ammonia and organic amines, said phenol aldehyde resin having been obtained by condensing 1 mol of a phenol selected from the group consisting of phenol, cresol, xylenol and mixtures thereof, with from 0.75 to 2 mols of formaldehyde under alkaline conditions.

References Cited in the file of this patent

UNITED STATES PATENTS

| | | |
|---|---|---|
| 1,579,195 | Ellis | Mar. 30, 1926 |
| 2,195,254 | Miller | Mar. 26, 1940 |
| 2,282,026 | Bren et al. | May 5, 1942 |
| 2,307,588 | Jackson et al. | Jan. 5, 1943 |
| 2,836,518 | Loritsch et al. | May 27, 1958 |

FOREIGN PATENTS

| | | |
|---|---|---|
| 691,252 | Great Britain | May 6, 1953 |

OTHER REFERENCES

Ellis: "Chemistry of Synthetic Resins," volume 1, 1935, Reinhold Pub. Corp., New York, page 346.